(12) United States Patent
Zhou et al.

(10) Patent No.: US 10,142,093 B2
(45) Date of Patent: *Nov. 27, 2018

(54) FAST CLOCK AND DATA RECOVERY FOR FREE-SPACE OPTICAL COMMUNICATIONS

(71) Applicant: X Development LLC, Mountain View, CA (US)

(72) Inventors: Leon Zhou, San Jose, CA (US); Sheng-Hui Yang, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,078

(22) Filed: Jul. 13, 2017

(65) Prior Publication Data

US 2017/0373823 A1   Dec. 28, 2017

Related U.S. Application Data

(63) Continuation of application No. 15/176,984, filed on Jun. 8, 2016, now Pat. No. 9,749,123.

(51) Int. Cl.
*H04B 10/50*  (2013.01)
*H03K 17/30*  (2006.01)
(Continued)

(52) U.S. Cl.
CPC ............ *H04L 7/0075* (2013.01); *H04B 10/11* (2013.01); *H04L 7/0016* (2013.01);
(Continued)

(58) Field of Classification Search
CPC ..... H04B 10/11; H04L 7/0075; H04L 7/0016; H04L 7/0331
(Continued)

(56) References Cited

U.S. PATENT DOCUMENTS 7,181,146 B1 *   2/2007   Yorks ................ H04B 10/0799
                                                                      398/195
9,219,470 B1   12/2015   Venditti
(Continued)

FOREIGN PATENT DOCUMENTS

CN          202798734 U       3/2013

OTHER PUBLICATIONS

Continuous Rate 10 Mb/s to 1.25 Gb/s Clock and Data Recovery IC with Integrated Limiting Amp ADN2813 Jan. 1, 2005, pp. 1-28 Norwood, MA.
(Continued)

*Primary Examiner* — Dalzid Singh
(74) *Attorney, Agent, or Firm* — Lerner, David, Littenberg, Krumholz & Mentlik, LLP

(57) ABSTRACT

A method includes receiving an optical signal through an optical link and determining a receiving power for the optical link. The method further includes comparing the receiving power for the optical link to a first receiving power threshold and transitioning a clock and data recovery circuit form a normal mode to a holdover mode when the receiving power is less than the first receiving power threshold. The clock and data recovery circuit, when operating in the holdover mode, configured to hold a recovered clock to a known-good clock frequency. When the receiving power for the optical link is greater than a second receiving power threshold, the method initiates a transition of the clock and data recovery circuit from the holdover mode to the normal mode and reacquires synchronization between the recovered clock and a current rate of the incoming data stream using the known-good clock frequency.

30 Claims, 11 Drawing Sheets

(51) Int. Cl.
    *H03K 5/1534*     (2006.01)
    *H03K 19/20*     (2006.01)
    *H04L 7/00*     (2006.01)
    *H04B 10/11*     (2013.01)
    *H04L 7/033*     (2006.01)
    *H04L 7/10*     (2006.01)

(52) U.S. Cl.
    CPC .......... *H04L 7/0083* (2013.01); *H04L 7/0331* (2013.01); *H04L 7/0029* (2013.01); *H04L 7/033* (2013.01); *H04L 7/10* (2013.01)

(58) Field of Classification Search
    USPC ........................................................ 398/118
    See application file for complete search history.

(56) References Cited

U.S. PATENT DOCUMENTS

| | | | |
|---|---|---|---|
| 9,641,315 B2* | 5/2017 | Bogdan | ................ H04L 7/0079 |
| 2002/0097468 A1 | 7/2002 | Mecherle et al. | |
| 2004/0037566 A1 | 2/2004 | Willebrand et al. | |
| 2004/0141752 A1 | 7/2004 | Shelton et al. | |
| 2005/0069322 A1 | 3/2005 | Tegge et al. | |
| 2006/0146959 A1 | 7/2006 | Aziz et al. | |
| 2009/0110405 A1* | 4/2009 | Lee | ................... H04B 10/1143 |
| | | | 398/130 |

OTHER PUBLICATIONS

Intenational Search Report and Written Opinion for related Application No. PCT/US2017/032500 dated Aug. 25, 2017.

\* cited by examiner

FAST CLOCK AND DATA RECOVERY FOR FREE-SPACE OPTICAL COMMUNICATIONS

CROSS REFERENCE TO RELATED APPLICATIONS

This U.S. patent application is a continuation of, and claims priority under 35 U.S.C. § 120 from, U.S. patent application Ser. No. 15/176,984, filed on Jun. 8, 2016, which is hereby incorporated by reference in its entirety.

TECHNICAL FIELD

This disclosure relates to recovering clock and data from transitions on incoming data streams in free-space optical communications.

BACKGROUND

Communication terminals, such as aerial communication devices that operate at high altitudes, may transmit and receive optical signals through free space optical links. Density of the air, wind speeds, air pressure, and turbulence may cause air scintillation across optical links to fluctuate. Optical fading (e.g., air scintillation) may perturb one or more of the optical signals communicated between the communication terminals. For instance, an optical fade may cause a received signal strength of an optical signal at a receiving one of the communication terminals to drop below a detection threshold. As a result, optical link loss may occur and data included in the optical signals may not be received by the receiving communication terminal or partially received by the receiving communication terminal. Moreover, the clock may also be lost due to missing or noisy transitions in the incoming data stream included in the optical signals. While the transmitting terminal likely stores the lost data in a buffer waiting for retransmission, a clock and data recovery circuit (CDR) at the receiving terminal typically requires a long acquisition time for clock and data recovery after the atmospheric channel comes out of the fade. Generally, longer CDR acquisition times reduce data transmission windows over the available optical link once the atmospheric channel comes out of the fade.

SUMMARY

One aspect of the disclosure provides a method for free-space optical communication clock and data recovery. The method includes: receiving, at a first communication terminal, an optical signal containing an incoming stream of data from a second communication terminal through a free space optical link; determining, by control hardware of the first communication terminal, a receiving power for the optical link based on the optical signal; comparing, by the control hardware, the receiving power to a first receiving power threshold; and comparing, by the control hardware, the receiving power to a second receiving power threshold. The first communication terminal has a clock and data recovery circuit operable in a normal mode to synchronize a recovered clock with the incoming data stream for recovering data from the optical signal. The control hardware implements the clock and data recovery circuit. When the receiving power for the optical link is less than the first receiving power threshold, the method includes transitioning, by the control hardware, the clock and data recovery circuit from the normal mode to a holdover mode. The clock and data recovery circuit, when operating in the holdover mode, are configured to hold the recovered clock to a known-good clock frequency when optical fading over the optical link is absent. When the receiving power for the optical link is greater than the second receiving power threshold, the method includes initiating, by the control hardware, a transition of the clock and data recovery circuit from the holdover mode to the normal mode, and reacquiring, by the control hardware, synchronization between the recovered clock and a current rate of the incoming data stream using the known-good clock frequency.

Implementations of the disclosure may include one or more of the following optional features. In some implementations, the method includes detecting, by the control hardware, a received signal strength from the optical signal. Determining the receiving power for the optical link may be based on the received signal strength of the optical signal. The first receiving power threshold may be based on a first received signal strength threshold, and the second receiving power threshold may be based on a second received signal strength threshold. In some examples, the method includes determining, by the control hardware, an onset of an optical fade over the optical link when the receiving power for the optical link is less than the first receiving power threshold. The first receiving power threshold may be less than or equal to the second receiving power threshold.

In some implementations, the clock and data recover circuit includes a frequency locked loop configured to recover the clock from the incoming data stream during the normal mode or hold the recovered clock to the known-good clock frequency during the holdover mode, and a data recovery loop configured to align the recovered clock with a phase of the incoming data stream to recover the data. In some examples, the method includes: determining, by the control hardware, phase/frequency errors of the frequency locked loop based upon a difference between a data rate of the incoming data stream and a frequency of the recovered clock; digitizing, by the control hardware, the phase/frequency errors to produce digital clock samples of the frequency locked loop; and inputting, by the control hardware, the digital clock samples to a digital filter of the frequency locked loop. For each digital clock sample input to the digital filter, the method may include applying, by the control hardware, predefined acceptance-rejection criteria to determine whether each digital clock sample is accepted or rejected, and filtering, by the control hardware, each accepted digital clock sample to output a running average of the data rate of the incoming data stream from the digital filter.

When the clock and data recovery circuit operates in the normal mode, the method may include converting, by the control hardware, the digital clock samples to analog clock samples, and driving, by the control hardware, a voltage control oscillator of the clock and data recovery circuit with the analog clock samples to output the recovered clock. When the clock and data recovery circuit operates in the holdover mode, the method may include converting, by the control hardware, the running average of the data rate of the incoming data stream output from the digital filter into an analog signal, and driving, by the control hardware, a voltage oscillator of the clock and data recovery circuit with the analogue signal to output a holdover clock, the holdover clock input to the data recovery loop.

Applying the predefined acceptance-rejection criteria may include arranging, by the control hardware, the digital clock samples input to the digital filter into one or more corresponding frames of a frame structure and determining, by the control hardware, whether a frame alignment sequence is identified in a beginning of each frame. When the frame alignment sequence is not identified in the beginning of a current frame, the method may include rejecting, by the control hardware, each digital clock sample in the current frame. When the frame alignment sequence is not identified in the beginning of the current frame, the method may include rejecting, by the control hardware, each digital clock sample in a previous frame. When the frame alignment sequence is identified in the beginning of the current frame, the method may include accepting, by the control hardware, each digital clock sample in the current frame when the frame alignment sequence is identified in the beginning of a subsequent frame, or rejecting, by the control hardware, each digital clock sample in the current frame when the frame alignment sequence is not identified in the beginning of the subsequent frame.

In some examples, the method includes: determining, by the control hardware, phase errors of the frequency locked loop based upon a difference between a phase of the incoming data stream and a phase of the recovered clock output from a phase interpolator of the frequency locked loop; digitizing, by the control hardware, the phase errors to produce digital control states; and inputting, by the control hardware, the digital control states to a digital filter of the frequency locked loop. For each digital control state input to the digital filter, the method may include applying, by the control hardware, predefined acceptance-rejection criteria to determine whether each digital clock sample is accepted or rejected and filtering, by the control hardware, each accepted digital clock sample to output a running average of the data rate of the incoming data stream from the digital filter. The phase interpolator may output the recovered clock by combining multi-phase clocks obtained from a fundamental clock. When the clock and data recovery circuit operates in the normal mode, the method may include inputting, by the control hardware, the digital control states to the phase interpolator to output the recovered. When the clock and data recovery circuit operates in the holdover mode, the method may include inputting, by the control hardware, the running average of the data rate of the incoming data stream to the phase interpolator to output a holdover clock.

Another aspect of the disclosure provides a communication terminal. The communication terminal includes: receiving optics configured to receive an optical signal from a second communication terminal through a free space optical link; control hardware in communication with receiving optics and implementing a clock and data recovery circuit operable in a normal mode to synchronize a recovered clock with the incoming data stream for recovering data from the optical signal; and memory hardware in communication with the control hardware. The memory hardware stores instructions that when executed on the control hardware cause the control hardware to perform operations. The operations include: determining a receiving power for the optical link based on the optical signal, the control hardware implementing the clock and data recovery circuit; comparing the receiving power to a first receiving power threshold; and comparing the receiving power to a second receiving power threshold. When the receiving power for the optical link is less than the first receiving power threshold, the operations include transitioning the clock and data recovery circuit from the normal mode to a holdover mode, the clock and data recovery circuit. When operating in the holdover mode, the communication terminal is configured to hold the recovered clock to a known-good clock frequency when optical fading over the optical link is absent. When the receiving power for the optical link is greater than the second receiving power threshold, the operations include initiating a transition of the clock and data recovery circuit from the holdover mode to the normal mode, and reacquiring synchronization between the recovered clock and a current rate of the incoming data stream using the known-good clock frequency.

Implementations of the disclosure may include one or more of the following optional features. In some implementations, the operations include detecting a received signal strength from the optical signal, wherein determining the receiving power for the optical link is based on the received signal strength of the optical signal. The first receiving power threshold may be based on a first received signal strength threshold, and the second receiving power threshold may be based on a second received signal strength threshold. The operations may further include determining an onset of an optical fade over the optical link when the receiving power for the optical link is less than the first receiving power threshold. The first receiving power threshold may be less than or equal to the second receiving power threshold.

In some examples, the clock and data recover circuit includes a frequency locked loop configured to recover the clock from the incoming data stream during the normal mode or hold the recovered clock to the known-good clock frequency during the holdover mode and a data recovery loop configured to align the recovered clock with a phase of the incoming data stream to recover the data. The operations may also include: determining phase/frequency errors of the frequency locked loop based upon a difference between a data rate of the incoming data stream and a frequency of the recovered clock; digitizing the phase/frequency errors to produce digital clock samples of the frequency locked loop; and inputting the digital clock samples to a digital filter of the frequency locked loop. For each digital clock sample input to the digital filter, the operations may include applying predefined acceptance-rejection criteria to determine whether each digital clock sample is accepted or rejected and filtering each accepted digital clock sample to output a running average of the data rate of the incoming data stream from the digital filter.

When the clock and data recovery circuit operations in the normal mode, the operations may include converting the digital clock samples to analog clock samples and driving a voltage control oscillator of the clock and data recovery circuit with the analog clock samples to output the recovered clock. When the clock and data recovery circuit operates in the holdover mode, the operations may include converting the running average of the data rate of the incoming data stream output from the digital filter into an analog signal and driving a voltage oscillator of the clock and data recovery circuit with the analogue signal to output a holdover clock, the holdover clock input to the data recovery loop. Applying the predefined acceptance-rejection criteria may include arranging the digital clock samples input to the digital filter into one or more corresponding frames of a frame structure and determining whether a frame alignment sequence is identified in a beginning of each frame. When the frame alignment sequence is not identified in the beginning of a current frame, the operations may include rejecting each digital clock sample in the current frame. When the frame alignment sequence is not identified in the beginning of the current frame, the operations may include rejecting each digital clock sample in a previous frame.

In some examples, the operations include, when the frame alignment sequence is identified in the beginning of the current frame, accepting each digital clock sample in the current frame when the frame alignment sequence is identified in the beginning of a subsequent frame, or rejecting each digital clock sample in the current frame when the frame alignment sequence is not identified in the beginning of the subsequent frame. The operations may also include determining phase errors of the frequency locked loop based upon a difference between a phase of the incoming data stream and a phase of the recovered clock output from a phase interpolator of the frequency locked loop; digitizing the phase errors to produce digital control states; and inputting the digital control states to a digital filter of the frequency locked loop. For each digital control state input to the digital filter, the operations may include applying predefined acceptance-rejection criteria to determine whether each digital clock sample is accepted or rejected, and filtering each accepted digital clock sample to output a running average of the data rate of the incoming data stream from the digital filter. The phase interpolator may output the recovered clock by combining multi-phase clocks obtained from a fundamental clock. When the clock and data recovery circuit operates in the normal mode, the operations include inputting the digital control states to the phase interpolator to output the recovered clock. When the clock and data recovery circuit operates in the holdover mode, the operations may include inputting the running average of the data rate of the incoming data stream to the phase interpolator to output a holdover clock.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Communication terminals may transmit and receive optical signals containing data between one another over free space optical links. Turbulent air may perturb the optical link and cause transitions in the incoming data that require the receiving terminals to recover a clock from the optical signal and retime the data with the recovered clock to enable recovery of the data. The optical link may experience intermittent periods of optical fading due to turbulence across the optical link that causes the incoming data to be entirely lost or partially lost. Generally, receiving terminals employing typical clock and data recovery circuits require long acquisition times to reacquire a recovered clock and synchronize the clock with a current rate of the incoming data stream once the conditions over the optical link improve, and the optical link comes out of the fade. To shorten this long acquisition time, implementations herein are directed toward holding the recovered clock to a known-good frequency at the onset of an optical fading event and using the known-good frequency once the optical link comes out of the optical fade to quickly reacquire synchronization with the current rate of the incoming data stream.

Figure 1A:
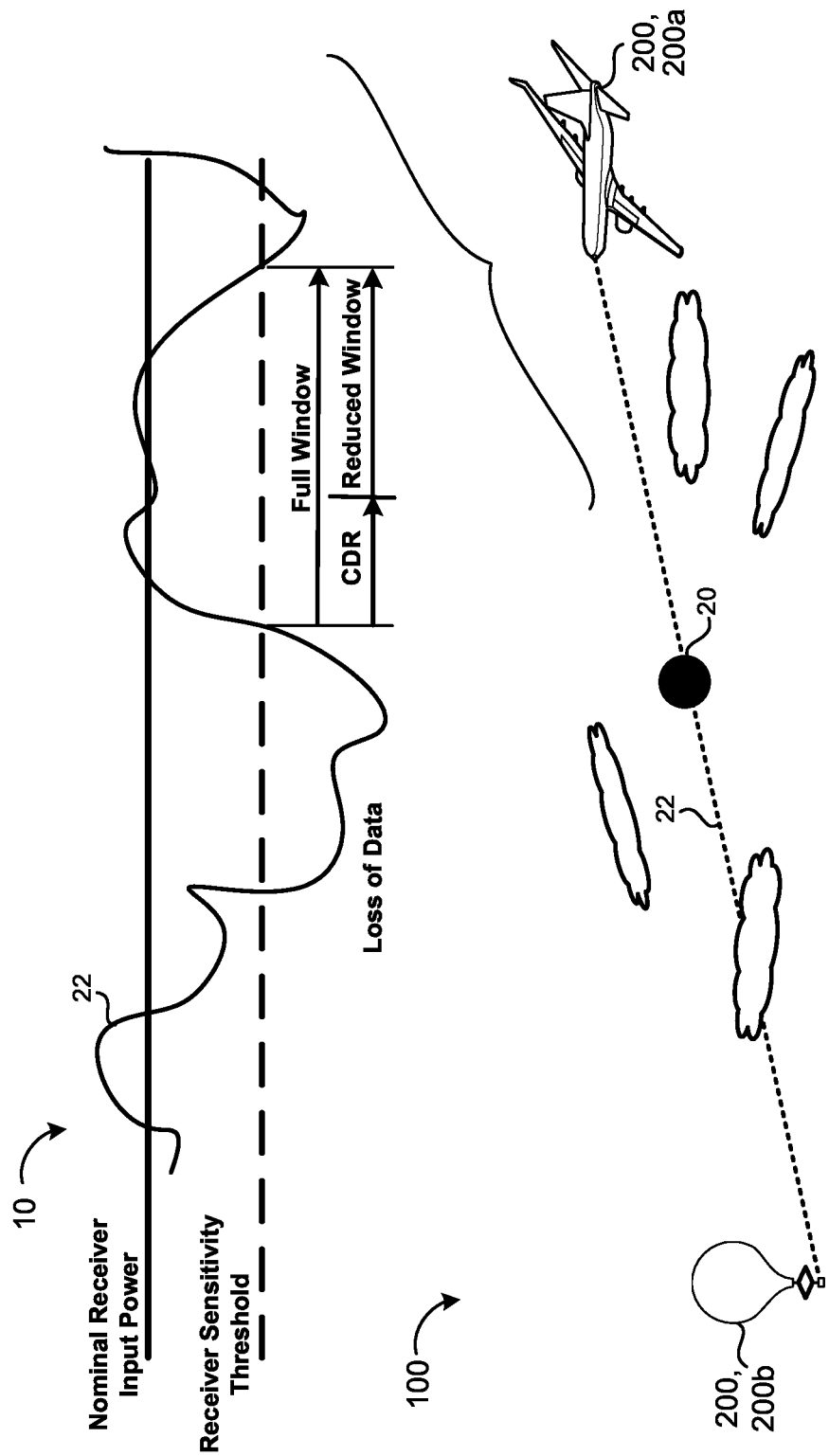
FIGS. 1A and 1B are schematic views of an example communication system.
Figure 1B:
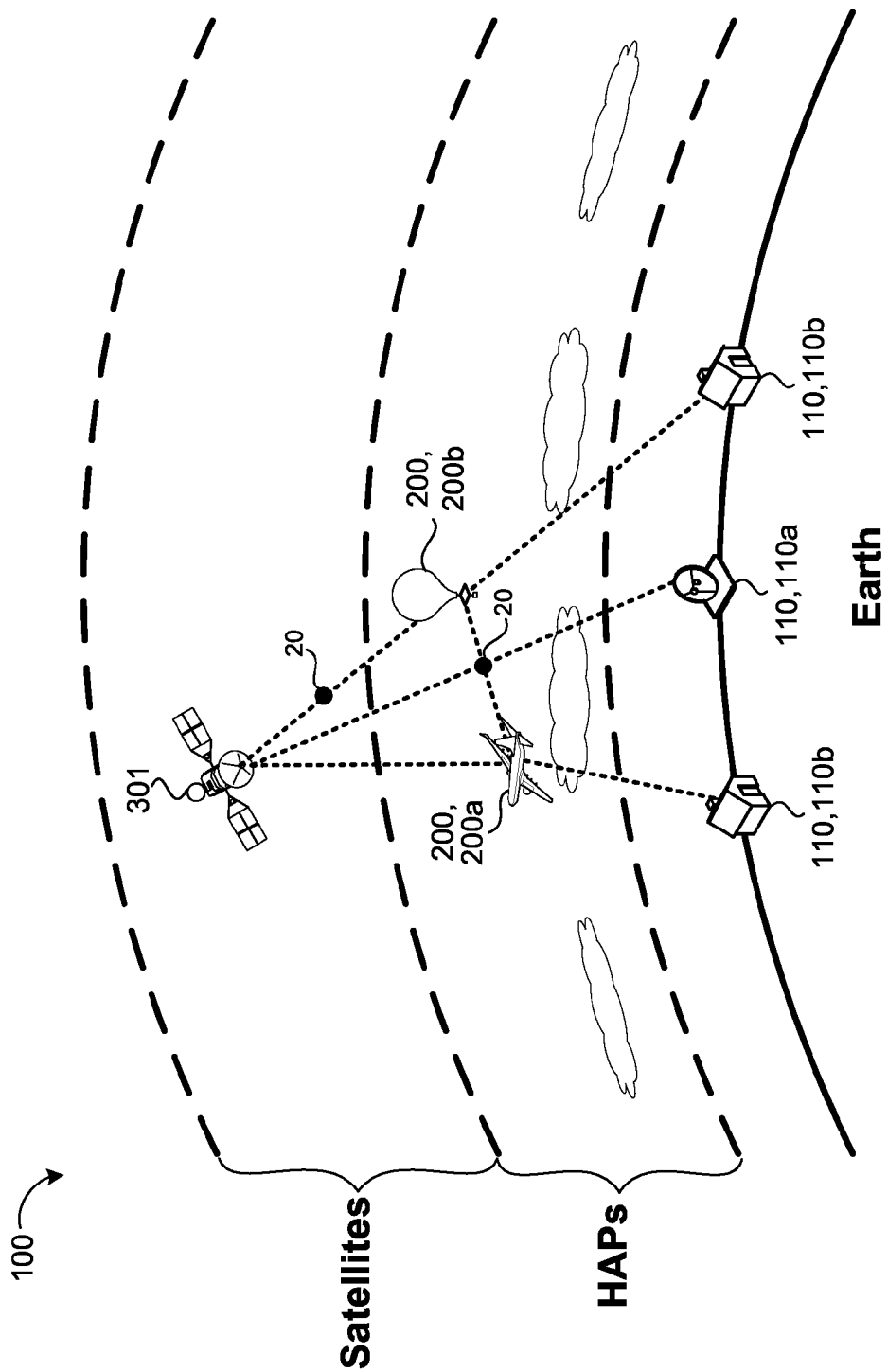

Referring to FIGS. 1A and 1B, in some implementations, a global-scale communication system 100 includes gateways 110 (e.g., source ground stations 110a and destination ground stations 110b), high altitude platforms (HAPs) 200, 200a-b, and satellites 301. The source ground stations 110a may communicate with the satellites 301, the satellites 301 may communicate with the HAPs 200, and the HAPs 200 may communicate with one another and with the destination ground stations 110b.

FIG. 1A shows two HAPs 200 (e.g., an aircraft 200a, such as an unmanned aerial vehicle (UAV), and a communication balloon 200b) communicating with one another by transmitting optical signals 20 through the earth's atmosphere via a free space optical link 22. A plot 10 of optical link availability as a function of time shows the receiving HAP 200 associated with a nominal receiver input power for maintaining the optical link 22 with the other HAP 200, whereby quality of the optical link 22 reduces when the receiving power for the optical link 22 falls below the nominal receiver input power. In some scenarios, the optical link 22 suffers from optical fades (e.g., air scintillation) that cause the receiving power for the optical link 22 to decrease and potentially compromise the quality of the optical link 22. Severe optical fades may result in a loss of the optical link 22 between the HAPs 200 when the receiving power for the optical link 22 falls below a receiver sensitivity threshold at the receiving HAP 200. Consequently, the loss of the optical link 22 results in a loss of data 320 (FIG. 3) as the receiving HAP 200 is unable to receive the communication 20 containing the data 320. Severe optical fades may additionally cause a loss of a recovered clock 322 (FIG. 3) due to missing or noisy transitions on the incoming data 320.

In some implementation, the transmitting HAP 200 stores the lost data 320 in a buffer and waits to retransmit the lost data 320 when the optical link 22 comes out of the optical fade. For instance, the optical link 22 may come out of the optical fade when the receiving power for the optical signal 20 reaches the receiver sensitivity threshold. The plot 10 shows a communication window representing availability of the optical link 22 beginning when the optical link 22 comes out of the optical fade and ending when the receiving power again falls below the receiver sensitivity threshold as a result of a another optical fade. The receiving HAP 200 typically employs a clock and data recovery (CDR) circuit 400, 400a-b (FIGS. 4A and 4B) to produce and synchronize the recovered clock 322 with a phase of the incoming data 320 after the optical link 22 comes out of the optical fade. Here, longer reacquisition times for the CDR circuit 400 to reacquire synchronization between the recovered clock 322 and the incoming data 320 reduce the communication window over the optical link 22. In some implementations, the CDR circuit 400 is operable to freeze or hold the recovered clock to a known-good frequency during the onset of an optical fade and use the known-good frequency to quickly reacquire synchronization between the recovered clock 322 and the incoming data 320 after the optical link 22 comes out of the optical fade. The freezing/holding of the recovered clock 322 to the known-good frequency drastically shortens the CDR reacquisition time, and therefore, optimizes availability for transmitting/receiving communications 20 over the optical link 22.

Referring to FIG. 1B, in some examples, the source ground stations 110a also operate as linking-gateways between the satellites 301. The source ground stations 110a may be connected to one or more service providers and the destination ground stations 110b may be user terminals (e.g., mobile devices, residential WiFi devices, home networks, etc.). In some implementations, the HAPs 200 include aerial communication devices that operate at high altitudes (e.g., 17-22 km). Each HAP 200 may be released into the earth's atmosphere, e.g., by an air craft, or flown to the desired altitude. Moreover, the HAP 200 may operate as a quasi-stationary aircraft. The HAP 200 may receive the communication 20 from one of the satellites 301 and reroute the communication 20 to another HAP 200 or one of the destination ground stations 110b. The satellite 301 may be in Low Earth Orbit (LEO), Medium Earth Orbit (MEO), or High Earth Orbit (HEO), including Geosynchronous Earth Orbit (GEO).

Figure 2B:
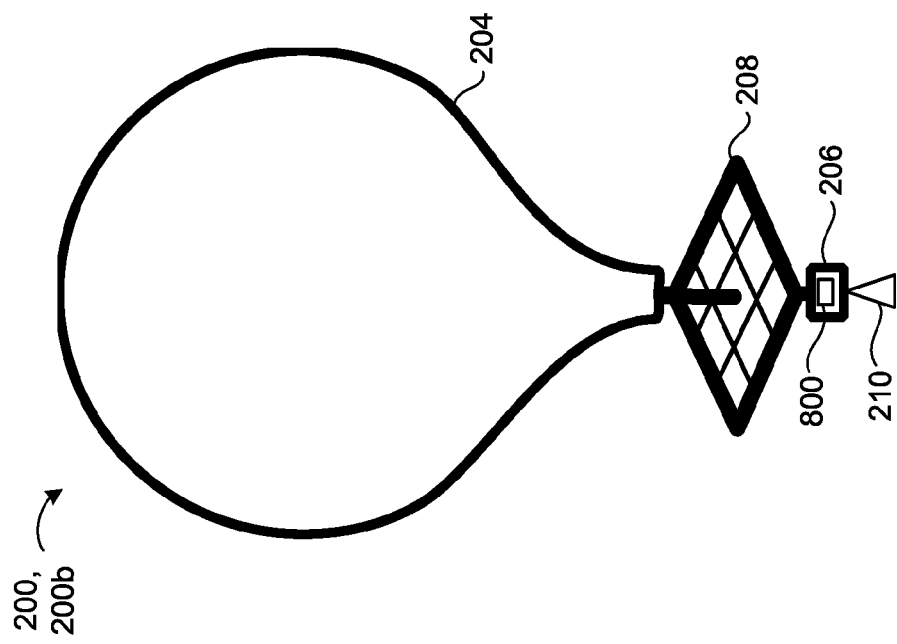
FIGS. 2A and 2B are perspective views of example high-altitude platforms.
Figure 2A:
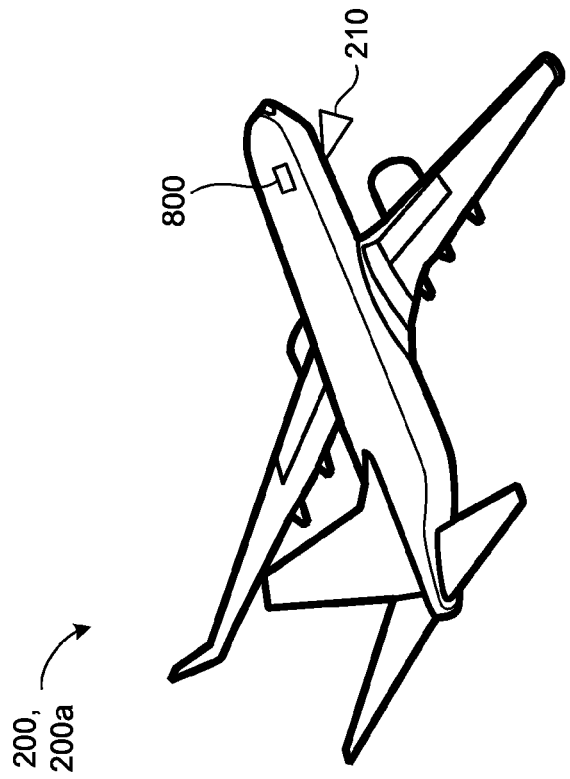

Referring to FIGS. 2A and 2B, in some implementations, the HAP 200 includes a transceiver 210 that receives the communication 20 from the satellite 301 or another HAP 200 and transmits the communication 20 to the destination ground station 110b or another HAP 200. The HAP 200 may include control hardware 800 that processes the received communication 20 and determines a path of the communication 20 to arrive at the destination ground station 110b or the other HAP 200.

FIG. 2B illustrates an example communication balloon 200b that includes a balloon 204 (e.g., sized about 49 feet in width and 39 feet in height and filled with helium or hydrogen), an equipment box 206, and solar panels 208. The equipment box 206 includes control hardware 800 that executes algorithms to determine a target location for the high-altitude balloon 200b, thereby allowing each high-altitude balloon 200b to move into a layer of wind blowing in a direction to take the balloon 200b to the target location. The equipment box 206 also includes batteries to store power and the transceiver 210 to communicate with other devices (e.g., other HAPs 200, satellites 301, gateways 110, such as user terminals 110b, internet antennas on the ground, etc.). The solar panels 208 may power the equipment box 206.

Communication balloons 200b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 200b float in the stratosphere at an altitude twice as high as airplanes and the weather (e.g., 20 km above the earth's surface). The high-altitude balloons 200b are carried around the earth by winds and can be steered by rising or descending to an altitude with winds moving in the desired direction. Winds in the stratosphere are usually steady and move slowly from about 5 mph to about 20 mph, and each layer of wind varies in direction and magnitude.

Figure 3:
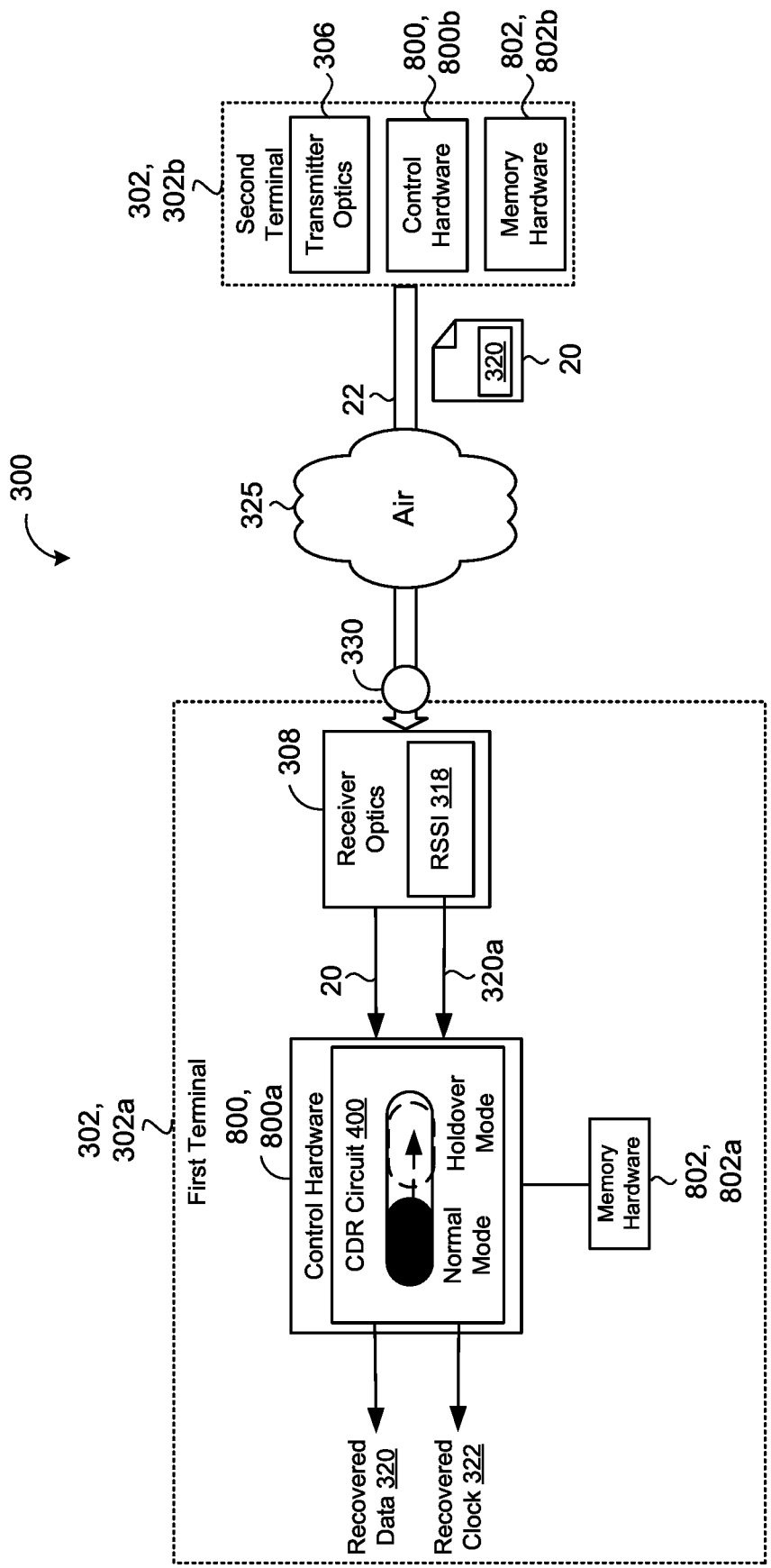
FIG. 3 is a schematic view of an example communication system providing optical signals through a free space optical link between a first communication terminal and a second communication terminal.

Referring to FIG. 3, in some implementations, a communication system 300 provides optical signals 20 between a first communication terminal 302a (hereinafter 'first terminal 302a') and a second communication terminal 302b (hereinafter 'second terminal 302b') through a free space optical link 22. The optical signals 20 may include data 320, such as a data stream of internet packets, being routed through the global-scale communication system 100. In some implementations, the terminals 302 include HAPs 200 operating at high altitudes (e.g., 17-22 km) within the Earth's atmosphere, thereby requiring the optical signals 20 to pass through air 325. Each terminal 302a, 302b may include transmitter optics 306, receiver optics 308, the control hardware 800, 800a-b, and memory hardware 802, 802a-b. The memory hardware 802 stores information, such as instructions executable by the control hardware 800, non-transitorily at the control hardware 800. The memory hardware 802 may be a computer-readable medium, a volatile memory unit(s), or non-volatile memory unit(s). The memory hardware 802 may be physical devices used to store programs (e.g., sequences of instructions) or data (e.g., program state information) on a temporary or permanent basis for use by the control hardware 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes. The control hardware 800 can be, for example, a processor executing computer-readable instructions stored in the memory hardware 802, a field programmable gate array (FGPA), a digital signal processor (DSP), or any other suitable circuitry.

In some implementations, scintillation of the air 325 causing optical power fades over the optical link 22 perturbs one or more of the optical signals 20 communicated between the terminals 302 via the optical link 22. For instance, air scintillation may cause a received signal strength 330 of the optical signal 20 at a receiving one of the terminals 302 to decrease or weaken. The receiving optics 308 may include a received signal strength indicator (RSSI) 318 configured to detect the received signal strength of the optical signal 20 when the receiving optics 308 receive the optical signal 20. The received signal strength 330 directly correlates to the receiving power for the optical link 22 such that a drastic decrease in the receiving power for the optical link 22 indicates a loss of the optical link 22. Accordingly, the control hardware 800 uses the received signal strength 330 to track optical fading over the optical link. Optical link loss may result in the receiving one of the terminals 302 failing to receive some or all of the data 320 within the optical signal 20 and/or losing an ability to recover a clock 322 from the incoming data 320 within the optical signal 20. For instance, optical link loss comprises the ability for the CDR circuit 400 to recover the clock 322 from the incoming data 320 and perform clock and data synchronization to recover the data 320 from the optical signal 20.

Generally, CDR circuits employed by optical communication systems, such as Optical Transport Networks (OTNs), are designed with an emphasis on timing accuracy and stability, these CDR circuits are ill-equipped for handling frequent losses of data 320 due to optical fading affects and promoting fast clock recovery once channel conditions improve. While burst-mode multiple-access systems, such as Passive Optical Networks (PONs), rely on preambles that contain training sequences to reset and require clock and data recovery, the use of preambles increases transmission overhead and clock and data recover in burst-mode is difficult and/or impractical to implement at high data rates, e.g., data rates at or above 10 Gbps.

In some examples, the control hardware 800 determines an onset of an optical fade over the optical link 22 when the receiving power for the optical link 22 (e.g., based on the received signal strength 330 of the optical signal 20) is less than a first receiving power threshold. In these examples, the control hardware 800 may trigger the CDR circuit 400 to transition from a normal mode to a holdover mode responsive to the receiving power for the optical link 22 falling below the first receiving power threshold. Incoming data 320 within received optical signals 20 is presumed to be "good" while the CDR circuit 400 operates in the normal mode when optical fading is absent. Conversely, the presence or onset of optical fading carries a presumption that the incoming data 320 within the received optical signals 20 is "bad", or about to be "bad", while the CDR circuit 400 operates in the holdover mode. Accordingly, the CDR circuit 400 holds the recovered clock 322 to a known-good frequency during the holdover mode when optical fading is present and uses the known-good frequency of the recovered clock 322 to reacquire synchronization with a current rate of the incoming data 320 once the channel condition improves and the CDR circuit 400 transitions back to the normal mode to successfully recovery the data 320.

The transmitter optics 306 may transmit the optical signals 20 and the receiver optics 308 may receive the optical signals 20 to establish the optical link 22. For instance, the transmitter optics 306 at the second terminal 302b may transmit the optical signal 20 to the receiver optics 308a at the first terminal 302a to establish the optical link 22. The receiver optics 308 may include, but are not limited to, an optical pre-amplifier, photodiodes, a photo receiver, transimpedance amplifiers, decision circuits, and/or the RSSI 318 to detect the signal strength of the optical signal 20 received by the receiver optics 308. The control hardware 800 may be in communication with the transmitter optics 306 and the receiver optics 308, and may include, but is not limited to, the CDR circuit 400 to obtain and synchronize the recovered clock 322 with a phase of the incoming data 320 and forward error correction circuits to convert the optical signals 20 (e.g., the synchronized clock/data) into electrical binary bits to interpret the data 320. Accordingly, the CDR circuit 400 may provide closed loop control for promoting fast clock reacquisition times and handle frequent losses of the incoming data 320 without compromising timing accuracy and stability requirements imposed by optical communication systems.

Figure 4A:
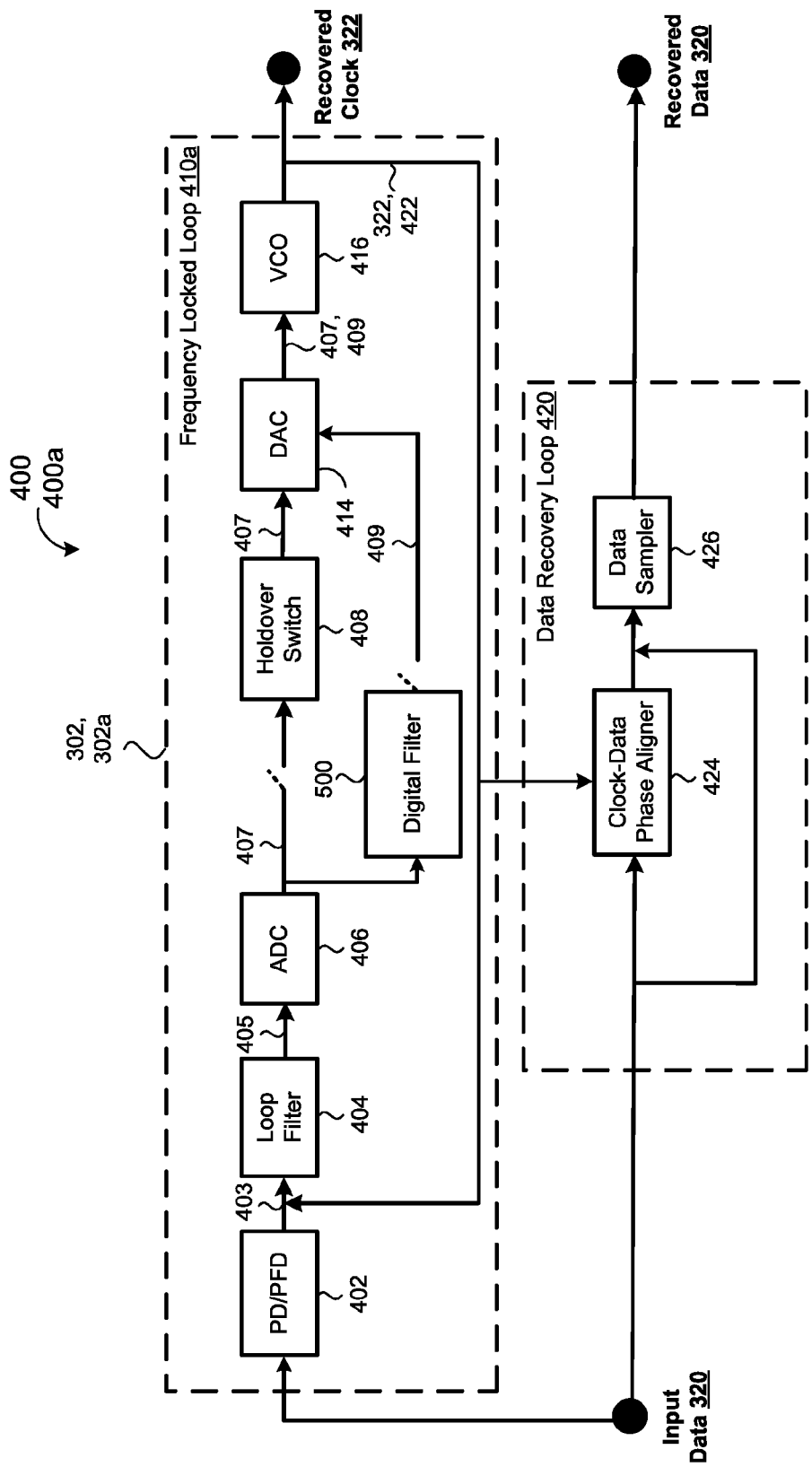
FIGS. 4A and 4B are schematic views of example communication terminals each including a clock and data recovery circuit having a frequency locked loop configured to output a recovered clock and a data recovery loop configured to output recovered data.
Figure 4B:
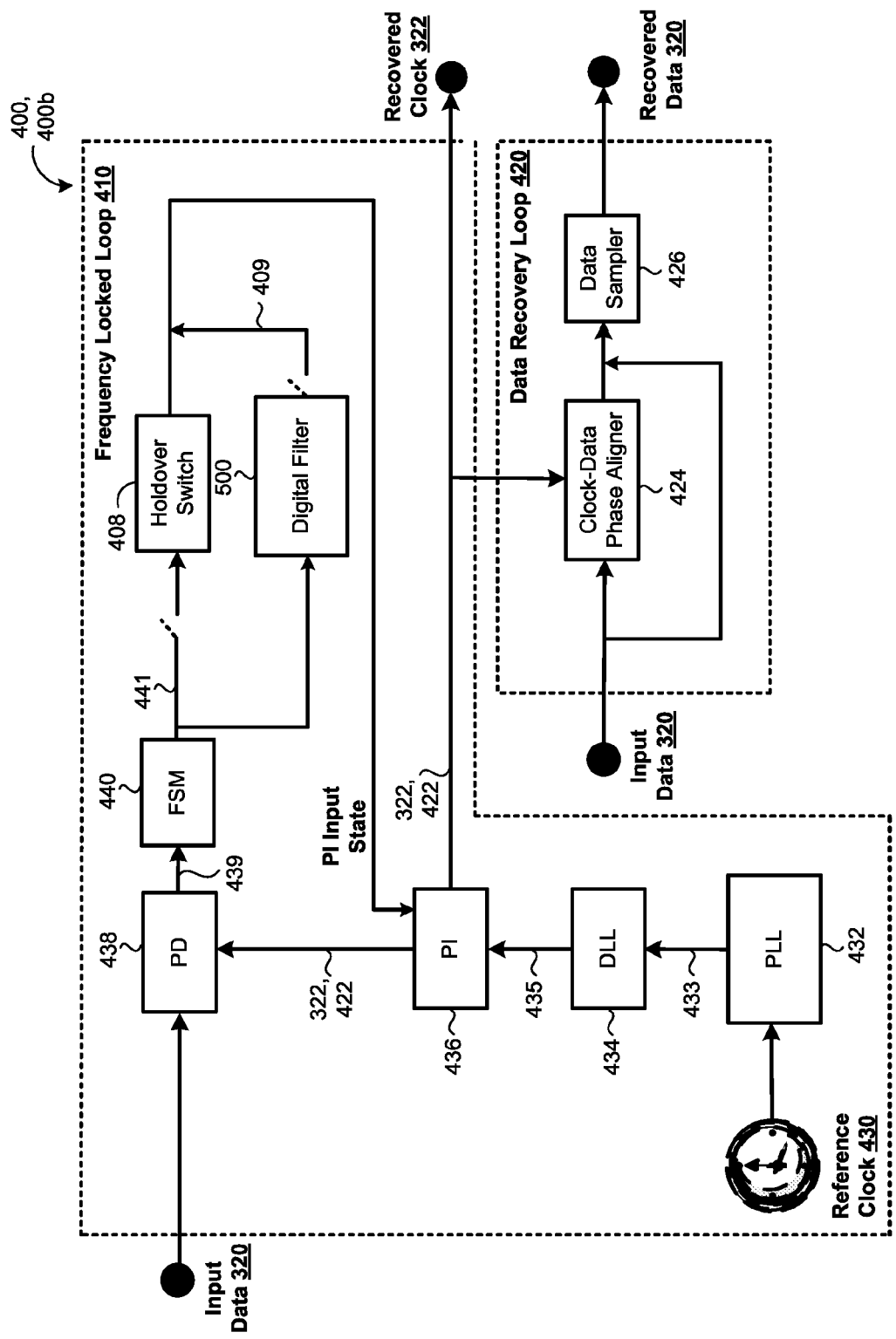

Referring to FIGS. 4A and 4B, in some implementations, the incoming stream of data 320 within the received optical signal 20 is input to both a frequency locked loop (FLL) 410 and a data recovery loop 420 of the CDR circuit 400, 400a-b. The input data 320 is both asynchronous and noisy, requiring the clock 322 be extracted/recovered to allow synchronous operations. Furthermore, the data 320 must be retimed to remove the jitter that accumulates during the transmission over the optical link 22. The FLL 410 is associated with a clock recovery loop that senses the input data 320 and produces the recovered clock 322 when the CDR circuit 400 operates in the normal mode. The recovered clock 322 from the FLL 410 feeds the data recovery loop 420 to retime the data 320 to produce an output of recovered data 320 with less jitter. For example, the data recovery loop 420 employs a clock-data phase aligner 424 configured to align the recovered clock 322 from the FLL 410 with a phase of the data 320 and uses a data sampler 426 to regenerate bits of the incoming data 320.

In general, the recovered clock 322 should include a frequency equal to the rate of incoming data 320. For instance, a data rate of 10 Gb/s with each bit 100 ps wide translates to a clock frequency of 10 GHz with a period of 100 ps. Moreover, the recovered clock 322 should bear a certain phase relationship with respect to the data 320 to optimize sampling of the bits of data 320 by the clock 322. For instance, if rising edges of the clock 322 coincide with the midpoint of each bit, the sampling occurs farthest from the preceding and subsequent data 320 transitions to provide maximum margin for jitter and/or other timing uncertainties. However, when the optical link 22 suffers from fading effects, i.e., caused by atmospheric turbulence, not only is the data 320 lost but the clock 322 can also be lost due to missing or noisy transitions. Thus, if the FLL 410 reacts to bad (e.g., lost) data 320 during optical fades, the FLL 410 may produce a large frequency difference from the rate of incoming data 320. As a result, CDR circuits traditionally start from a fresh clock after the optical link comes out of a fade, thereby requiring a long acquisition time for the CDR circuit to reacquire synchronization and timing between the recovered clock and the incoming data.

In order to reduce or shorten the long acquisition times associated with CDR circuits after optical links come out of a fade, and therefore improve the availability for communicating over the optical link 22, implementations are directed toward operating the CDR circuit 400 in the holdover mode as the link 22 is going into a fade. Here, the holdover mode is configured to hold the recovered clock 322 to the known-good clock frequency such that the clock 322 is frozen to a state when the data 320 is presumed to be "good," i.e., when the received signal strength 330 of the received optical signal 20 is strong enough to deliver the data 320. When the optical link 22 conditions improve, i.e., the fading event has passed, the CDR circuit 400 may transition back to the normal mode and start with the known-good clock frequency of the held/frozen clock 322 that closely matches a current rate of the incoming data 320 to thereby drastically reduce the clock reacquisition time.

FIG. 4A includes a linear CDR circuit 400a including the FLL 410 and the data recovery loop 420. The FLL 410 has a phase detector (PD)/phase-frequency detector (PFD) 402, a loop filter 404, an analog to digital converter (ADC) 406, a digital filter 500, a holdover switch 408, a digital to analog converter 414, and a voltage control oscillator (VCO) 416 configured to produce the recovered clock 322 and feed the recovered clock 322 to the clock-data phase aligner 424 of the data recovery loop 420. The PD/PFD 402 is operative to define the frequency and phase of the clock 322 by phase-locking the VCO 416 to the input data 320. For example, the PD/PFD 402 receives a previous recovered clock 322 output from the VCO 416 as feedback and compares it with the input data 320 to output a phase-frequency error signal 403 that is input to the loop filter 404 for suppressing ripple on the error signal 403. A filtered error signal 405 in analog form is input to the ADC 406 for converting the filtered error signal 405 into digital form. Accordingly, the ADC 406 digitizes the filtered error signal 405 during each iteration of the FLL 410 to produce digital clock samples 407 of the FLL 410. Thereafter, the digital clock samples 407 are input to the digital filter 500 for determining whether each digital clock sample 407 is accepted or rejected by applying predefined acceptance-rejection criteria. The digital filter 500 is configured to filter each accepted digital clock sample 407 to produce a running average of the data rate of the input data 320. To put another way, the running average of the data rate of the input data 320 refers to a running average of "good states" of the FLL 410. By digitizing the phase-frequency errors 403, 405, a state for each iteration of the FLL 410 can be saved (e.g., within the memory hardware 802) so that the CDR circuit 400 only relies on "good states" when the CDR circuit 400 operates in the holdover mode. As used herein, the term "good" states of the CDR circuit 400 refer to accepted digital clock samples when the received signal strength of the optical signal is sufficient for successfully delivering the input data 320, i.e., when the input data 320 is presumed to be good.

When the CDR circuit 400a operates in the normal mode, the holdover switch 408 is in a normal position to direct the digital clock samples 407 output from the ADC 406 through the DAC 414 for driving the VCO 416 to output the recovered clock 322. The recovered clock 322 is fed to the clock-data phase aligner 424 of the data recover loop 420 to recover the data 320 and also the PD/PFD 402 to produce a subsequent phase-frequency error signal 403. Moreover, the normal position of the holdover switch 408 prevents an output 409 of the digital filter 500 from passing through the DAC 414 and driving the VCO 416. Here, the output 409 corresponds to the running average of the data rate of the input data 320 (e.g. running average of "good states" of the FLL 410).

When the CDR circuit 400a operates in the holdover mode, the holdover switch 408 transitions to a holdover position to direct the output 409 from the digital filter 500 through the DAC 414 for driving the VCO 416 to output a holdover clock 422. Here, the holdover clock 422 corresponds to the known-good frequency of the recovered clock 322 for use when the optical link 22 comes out of a fade to shorten the acquisition time of the CDR 400 for recovering the clock 322.

Figure 5:
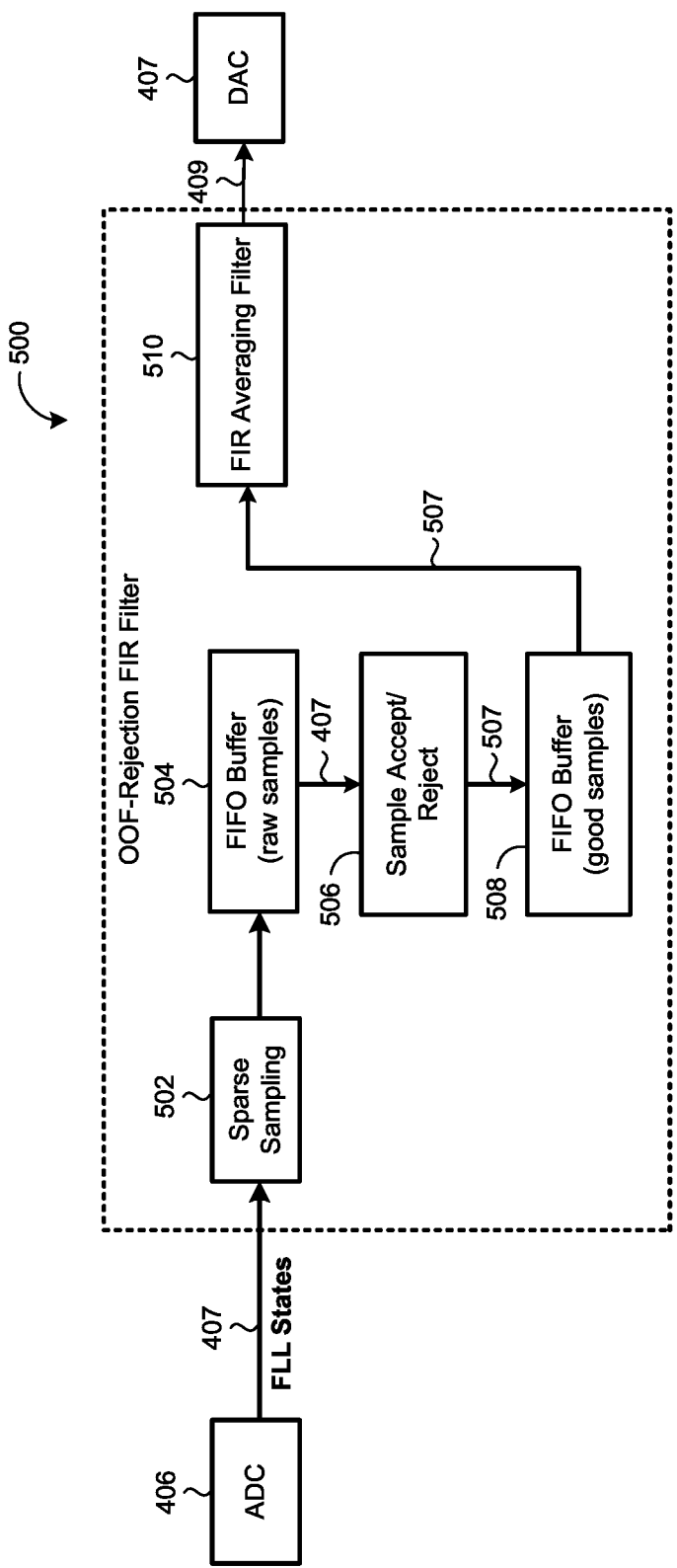
FIG. 5 is a schematic view of an example digital filter of a clock and data recovery circuit.

Referring to FIG. 5, in some implementations, the digital filter 500 includes an out-of-frame-rejection (OOF-Rejection) Finite Impulse Response (FIR) filter 500 including a sparse sampling component 502, a raw sample first in, first out (FIFO) buffer 504, a sample accept/reject component 506, a accepted sample FIFO buffer 508, and an FIR averaging filter 510 configured to produce the output 509 that feeds the VCO 416 when the CDR circuit 400 operates in the holdover mode.

The sparse sampling component 502 may increase a time constant when the holdover switch 408 of the CDR circuit 400 is in the holdover position to establish the holdover clock 422 as the long-term average of the data rate of the incoming data 320. The sparse sampling component 502 may also assist with reducing a required length of the raw sample FIFO buffer 504. The raw sample FIFO buffer 504 is configured to store the digital clock samples 407 (e.g., FLL states) digitized by the ADC 406 and provide the digital clock samples 407 to the sample accept/reject component 506. Thereafter, the sample accept/reject component 506 applies the predefined acceptance-rejection criteria to determine whether each raw digital clock sample 407 is accepted or rejected. In some implementations, the accepted sample FIFO buffer 508 stores each accepted digital clock samples 507 output from the sample accept/reject component 506 and the FIR averaging filter 510 produces the output 409 corresponding to the running average of the data rate of the input data 320 (e.g., running average of the "good states" of the FLL 410). The FIR averaging filter 510 will not update if the accepted sample FIFO buffer 508 is empty. The states of the FIR averaging filter 510 can be easily latched or unlatched due to the FIR averaging filter 510 operating in the digital domain. During operating in the holdover mode, the output 409 from the FIR averaging filter 510 is input to the DAC for conversion to the analog form before driving the VCO 416 to produce the holdover clock 422.

Figure 6:
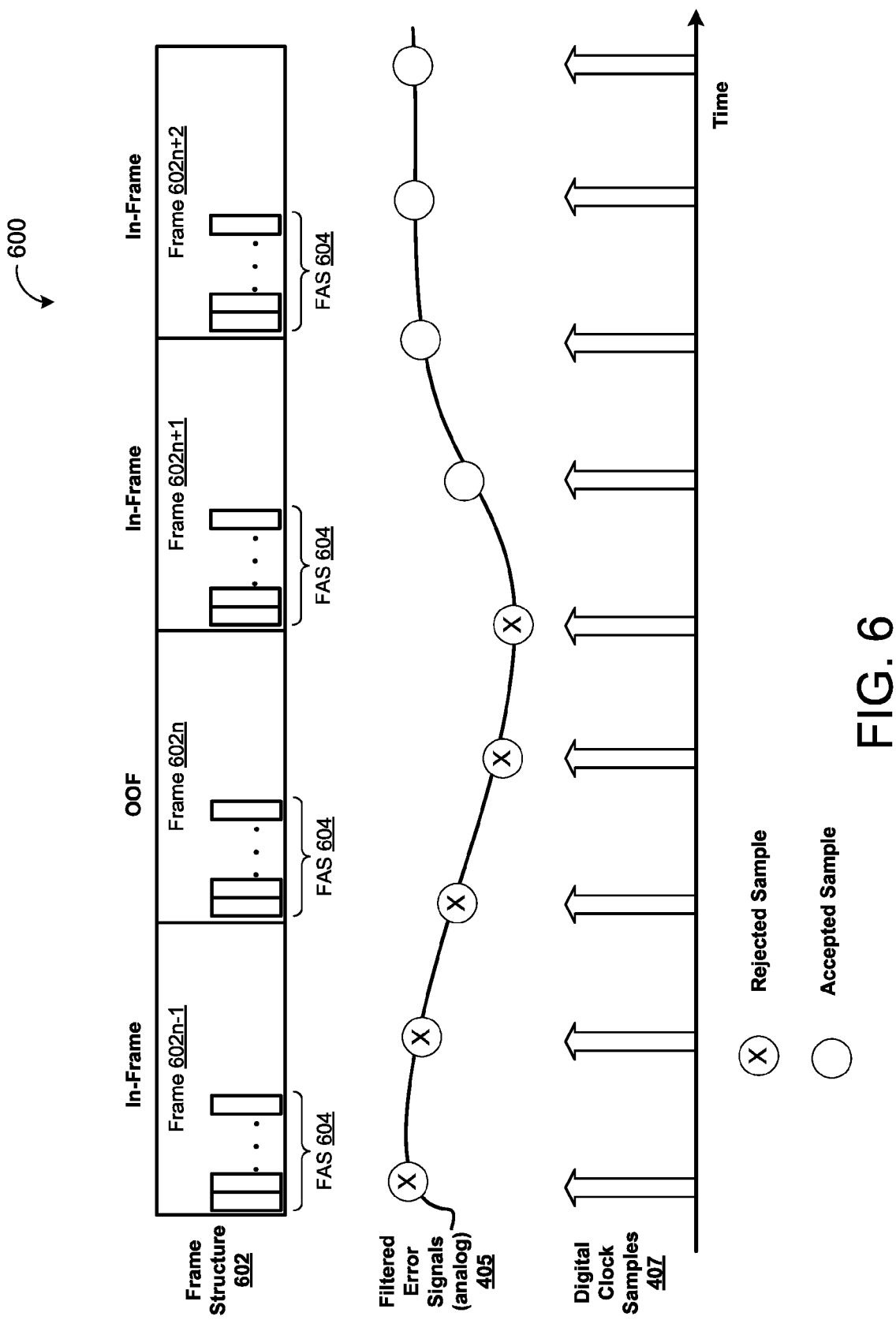
FIG. 6 shows a dual plot of a frame structure for an incoming data stream received by a communication terminal and digital clock samples obtained from the incoming data stream as a function of time.

The control hardware 800 at a transmitting one of the communication terminals 302 may employ a digital communication framer that wraps the data 320 carried by the optical signal 20 in a frame structure 602 (FIG. 6) having one or more frames 602n (FIG. 6). The frame structure 602 may include a frame alignment sequence (FAS) 604 (FIG. 6) in the beginning of each frame 602n to delineate frame boundaries and facilitate frame synchronization. Generally, the length of a frame 602n in a 10 Gbps data stream typically shorted than an expected duration of a fading event over the optical link 22. Accordingly, the frame alignment information can be leveraged to exploit the quality of recovered digital timing on relevant time scales from the received optical signal 20.

In some implementations, the predefined acceptance-rejection criteria applied by the sample accept/reject component 506 is associated with an OOF-based acceptance-rejection criterion that the leverages the frame alignment information associated with the frame structure 602 of the incoming data 320. FIG. 6 shows an example dual plot 600 of the frame structure 602 for the input data 320 and the digital clock samples 407 obtained from the input data 320 and output from the ADC 406 as a function of time. The filtered error signals 405 output from the loop filter 404 are digitized by the ADC 406 to output the digital clock samples 407, which provide the FLL states. Here, the sample accept/reject component 506 of the OOF-Rejection FIR filter 500 arranges the digital clock samples 407 into the corresponding frames 602n of the frame structure 602 and determines whether the FAS 604 is identified in the beginning of each frame 602n. The OOF-based acceptance-rejection criteria labels a corresponding frame 602n as "In-Frame" when the FAS 604 is identified or as "OOF" when the FAS 604 is not identified. Failing to identify the FAS 604 at the beginning of a frame 602n is a strong indicator that transitions in the data 320 have become extremely noisy or lost, such as when optical fades effect the optical link 22. FIG. 6 shows the frames 602n−1, 602n+1, and 602n+2 labeled as "In-Frame" while the frame 602n is labeled "OOF". Thereafter, the OOF-based acceptance-rejection criterion rejects each digital clock sample 407 in the current frame 602n (e.g., labeled as "OOF").

Additionally, as the FAS 604 is included in the beginning of each frame 602n, the noisy or lost data 320 causing the FAS 604 in the current frame 602n to go missing may have actually onset some time during the previous frame 602n−1 even though the previous frame 602n−1 is labeled In-Frame. In some examples, the OOF-based acceptance-rejection criteria rejects each digital clock sample 407 in the current frame 602n (e.g., labeled as "OOF") and the previous frame 602n−1 (e.g., labeled "In-Frame"). In doing so, the sample accept/reject component 506 takes a conservative approach by rejecting all digital clock samples 407 in a frame 602n−1 labeled In-Frame that immediately precedes a frame 602n labeled OOF so that the FLL 410 does not rely on bad data.

Figure 7A:
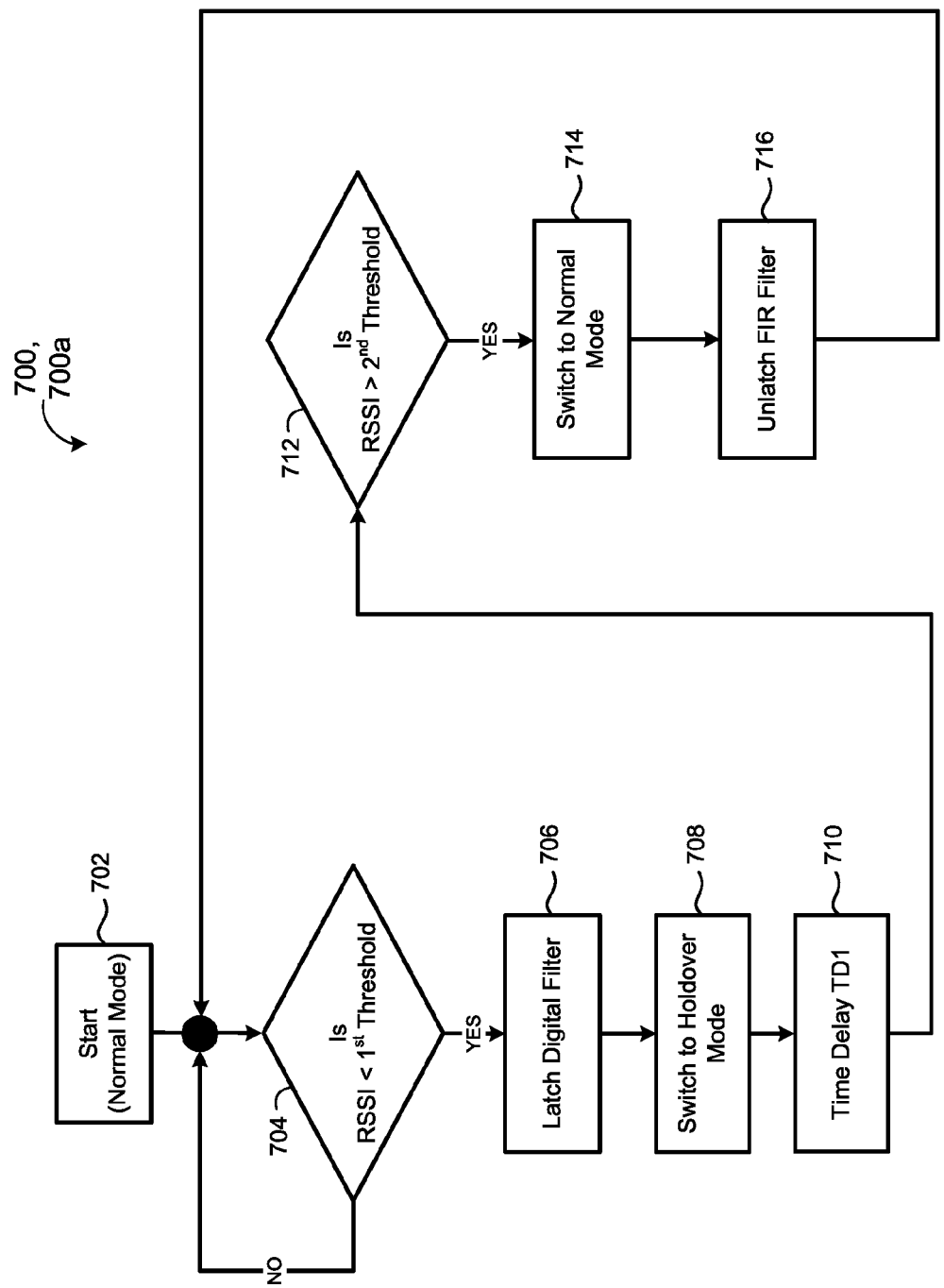
FIG. 7A is a flowchart of an example method for transitioning the example clock and data recovery circuit of FIG. 4A between a normal mode and a holdover mode.

FIG. 7A is a flowchart of an example method 700, 700a for transitioning the CDR circuit 400a of FIG. 4A between the normal mode and the holdover mode. The flowchart starts at operation 702 where the CDR circuit 400*a* at the receiving one of the communication terminals 302 initially operates in the normal mode for receiving the optical signal 20 from the transmitting one of the terminals 302 via the free-space optical link 22. At operation 704, the RSSI 318 detects the received signal strength 330 of the optical signal 20 when the receiving optics 308 receive the optical signal 20 and compares the received signal strength to a first received signal strength threshold. The CDR circuit 400*a* continues to operate in the normal mode when the control hardware 800 determines the received signal strength 330 is greater than or equal to the first received signal strength threshold (e.g., operation 704 is "NO").

On the other hand, when the control hardware 800 determines the received signal strength 330 is less than the first received signal strength threshold (e.g., operation 704 is "YES"), the control hardware 800 optionally latches the digital filter 500 at operation 706, and operation 708, triggers the CDR circuit 400*a* to transition to the holdover mode by switching the holdover switch 408 to the holdover position. In some examples, latching the digital filter 500 includes latching the digital clock samples 407 (e.g., FLL states) input to the digital filter 500 to freeze the recovered clock 322 output by the FLL 410 such that the recovered clock is held to the known-good frequency. In other examples, the digital filter 500 is unlatched to permit the FIR averaging filter 610 to continue to respond to the accepted digital samples 507 based on the OOF-based acceptance-rejection criteria. Accordingly, leaving the digital filter 500 unlatched may allow for recovery of the data 320 during a false-positive transition by the CDR circuit 400*a* to the holdover mode. Thus, the OOF-based acceptance-rejection criteria may determine that the received optical signal 20 is strong enough for recovering the data 20 therefrom even though the received signal strength 330 is less than the first received signal strength threshold.

At operation 710, the control hardware 800 may apply a time delay TD1 to prevent chattering before comparing the received signal strength 330 of the optical signal to a second received signal strength threshold at operation 712. In some examples, the second received signal strength threshold is equal to or greater than the first received signal strength threshold. Accordingly, the second received signal strength threshold may create hysteresis by corresponding to a signal strength that ensures that a transition back to the normal mode by the CDR circuit 400*a* only occurs when the optical link 22 comes out of the optical fading event. Therefore, the control hardware 800 transitions the CDR circuit 400*a* back to the normal mode at operation 714 after determining the received signal strength is greater than the second received signal strength threshold (e.g., operation 712 is a "YES"). Moreover, if the control hardware 800 previously latched the digital filter 500 at operation 706, the control hardware 800 unlatches the digital filter 500 at operation 716 to allow the states of the digital filter 500 to update again while the CDR circuit 400*a* operates in the normal mode. The control hardware 800 reverts back to operation 704 to determine whether or not the received signal strength of the received optical signal 20 is less than the first received signal strength threshold.

Referring back to FIG. 4B, in other implementations, the CDR circuit 400*b* includes a phase interpolator 436 (PI) based circuit in place of the linear CDR circuit 400*a* of FIG. 4A for extracting the recovered clock 322 from the received optical signal 20 containing the incoming data 320 and retiming the incoming data 320 to remove the jitter accumulating during the transitions over the optical link 22. The CDR circuit 400*b* includes the FLL 410 for recovering the clock 322 from the input data 320 and feeding the recovered clock 322 to the clock-data phase aligner of the data recovery loop 420. The FLL 410 has an independent reference clock source 430, a phase locked loop 432 (PLL), a delay locked loop 434 (DLL), the PI 436, a PD 438, a finite-state machine (FSM), and the digital filter 500. The PLL 432 synchronizes a frequency synthesis with the reference clock source 430 to generate a fundamental clock 433 input to the DLL 434 for generating multi-phase clocks 435. The PI 436 produces the recovered clock 322 by combining the multi-phase clocks 435.

The PD 428 is operative to define the phase of the clock 322 by phase-locking the PI 436 to the input data 320. For example, the PD 428 receives a previous recovered clock 322 output from the PI 436 as feedback and compares it with the input data 320 to output a phase error signal 439 that is input to the FSM 440. By contrast to the ADC 406 of the CDR circuit 400*a* of FIG. 4A that produces the digital clock samples 407, the FSM 440 outputs control states 441 for the PI 436 in digital form for input the digital filter 500. Accordingly, the FSM 440 receives the phase error signal 439 during each iteration of the FLL 410 to produce the digital control states 441. Thereafter, the control states 441 are input to the digital filter 500 for determining whether each digital control state 441 is accepted or rejected by applying the predetermined acceptance-rejection criteria as set forth above with respect to FIG. 5.

When the CDR circuit 400*b* operates in the normal mode, the holdover switch 408 is in a normal position to direct the digital control states 441 output from the FSM 440 as an input state for the PI 436 for producing the recovered clock 322 in association with the multi-phase clocks 435. The recovered clock 322 is fed to the clock-data phase aligner 424 of the data recover loop 420 to recover the data 320 and also the PD 438 to produce a subsequent phase error signal 439. Moreover, the normal position of the holdover switch 408 prevents the output 409 of the digital filter 500 from passing to the PI 436. Here, the output 409 corresponds to the running average of the data rate of the input data 320 (e.g. running average of "good states" of the FLL 410).

When the CDR circuit 400*b* operates in the holdover mode, the holdover switch 408 transitions to a holdover position to direct the output 409 from the digital filter 500 to the PI 436 to output the holdover clock 422. Here, the holdover clock 422 corresponds to the known-good frequency of the recovered clock 322 for use when the optical link 22 comes out of a fade to shorten the acquisition time of the CDR 400*b* for recovering the clock 322.

Figure 7B:
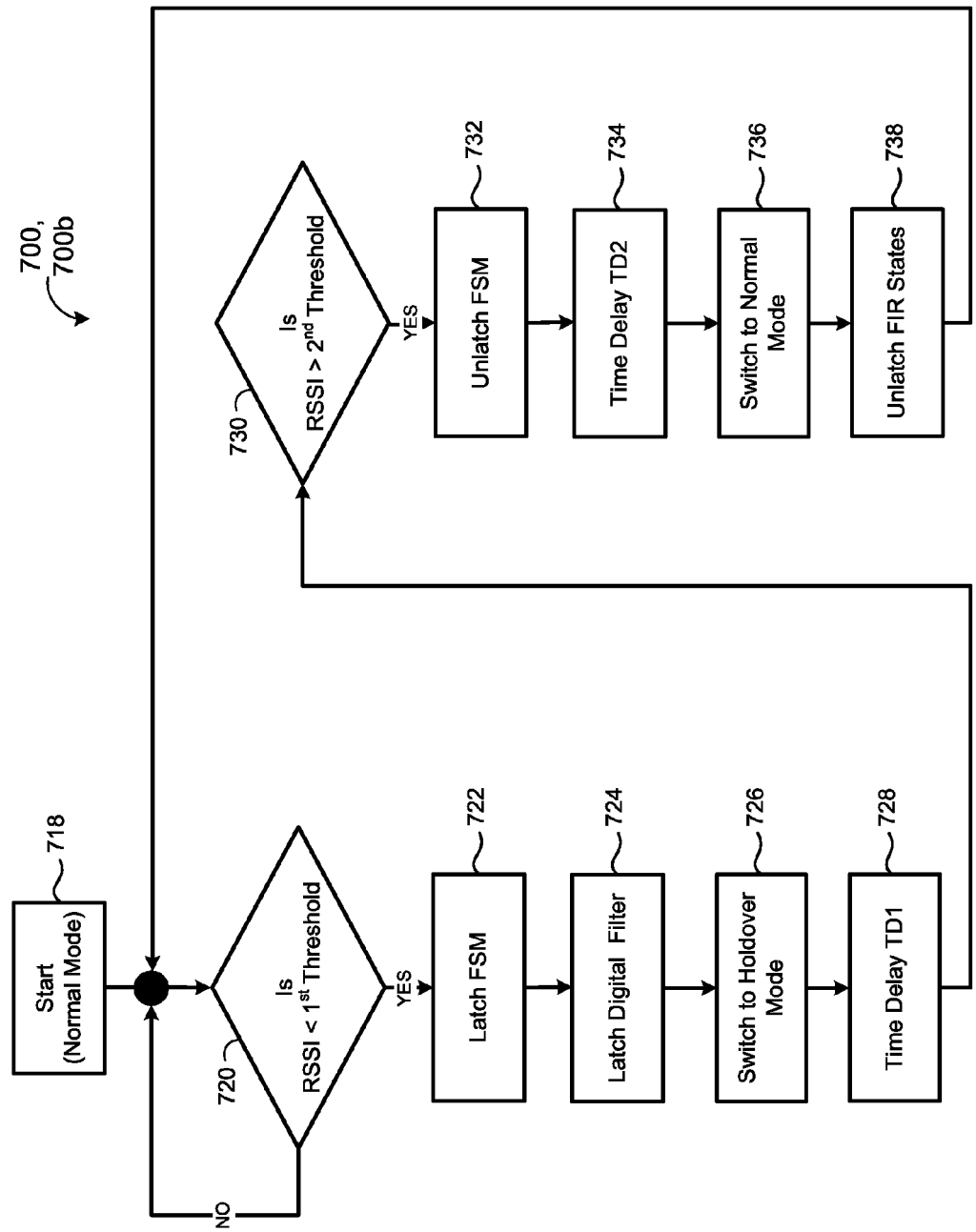
FIG. 7B is a flowchart of an example method for transitioning the example clock and data recovery circuit of FIG. 4B between a normal mode and a holdover mode.

FIG. 7B is a flowchart of an example method 700, 700*b* for transitioning the CDR circuit 400*b* of FIG. 4B between the normal mode and the holdover mode. The flowchart starts at operation 718 where the CDR circuit 400*b* at the receiving one of the communication terminals 302 initially operates in the normal mode for receiving the optical signal 20 from the transmitting one of the terminals 302 via the free-space optical link 22. At operation 720, the RSSI 318 detects the received signal strength 330 of the optical signal 20 when the receiving optics 308 receive the optical signal 20 and compares the received signal strength to the first received signal strength threshold. The CDR circuit 400*b* continues to operate in the normal mode when the control hardware 800 determines the received signal strength 330 is greater than or equal to the first received signal strength threshold (e.g., operation 720 is "NO").

Figure 8:
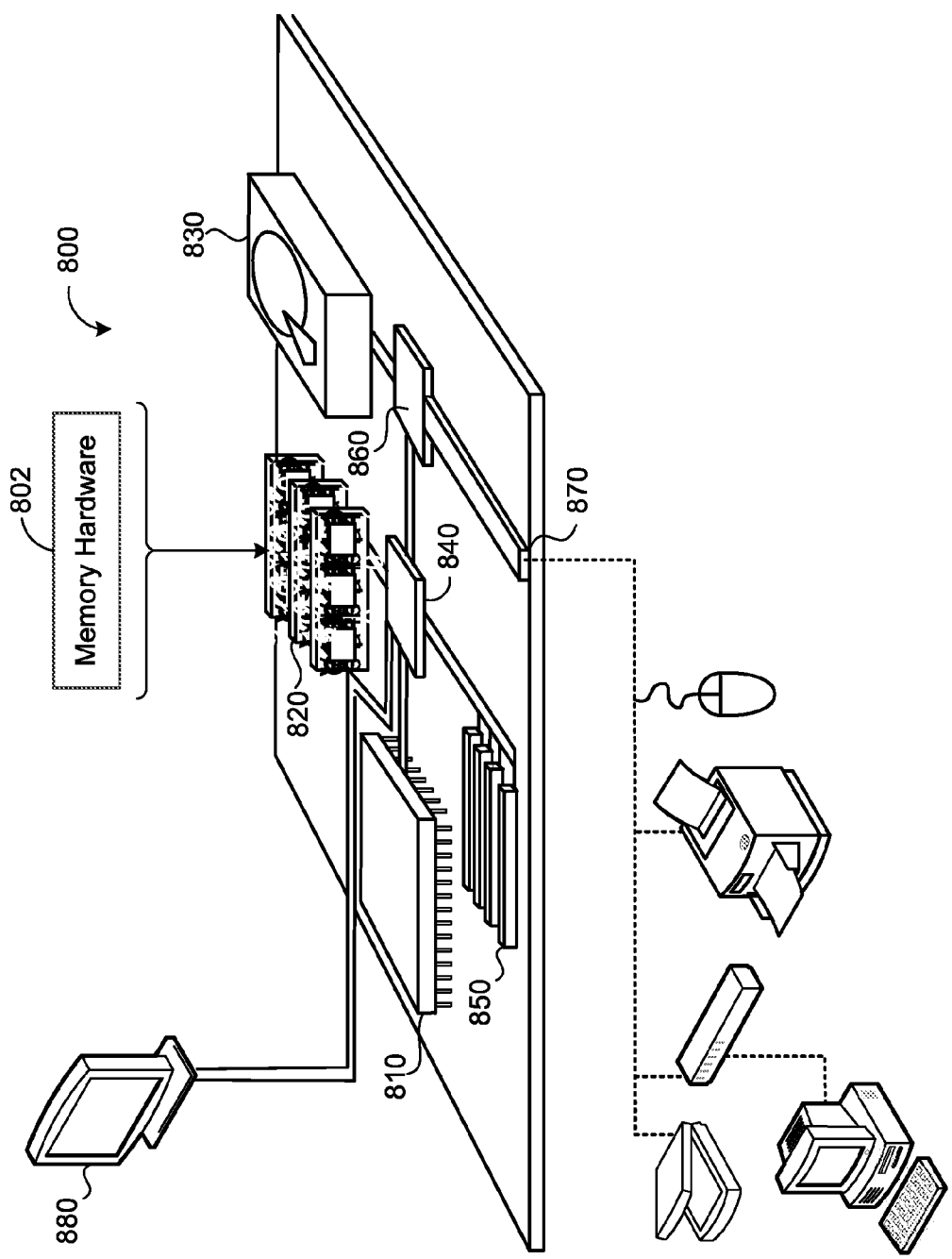
FIG. 8 is a schematic view of example control hardware of a communication terminal.

On the other hand, when the control hardware 800 determines the received signal strength 330 is less than the first received signal strength threshold (e.g., operation 720 is "YES"), the control hardware 800 latches the states of the FSM 440 and the digital filter 500 at operations 722 and 724, respectively, and at operation 726, triggers the CDR circuit 400*b* to transition to the holdover mode by switching the holdover switch 408 to the holdover position. At operation 728, the control hardware 800 may apply a first time delay TD1 to prevent chattering before comparing the received signal strength 330 of the optical signal to a second received signal strength threshold at operation 730. In some examples, the second received signal strength threshold is equal to or greater than the first received signal strength threshold. As set forth above with respect to the example method 700*a* of FIG. 7A, the second received signal strength threshold may be equal to or greater than the first received signal strength threshold to provide confidence that the receiving power for the optical link 22 is strong enough to permit a transition by the CDR circuit 400*b* back to the normal mode. Therefore, the control hardware 800 unlatches the states of the FSM 440 at operation 732, applies a second time delay TD2 at operation 734, and transitions the CDR circuit 400*b* back to the normal mode at operation 736 after determining the received signal strength 330 is greater than the second received signal strength threshold (e.g., operation 730 is "YES"). The second time delay TD2 allows the states of the FSM 440 to settle before the CDR circuit 400*b* fully switches from the holdover mode to the normal mode. In some examples, the second time delay TD2 is selected to a sufficiently small value since the PD 438 is drive by two valid inputs. Moreover, the control hardware 100 unlatches the digital filter 4500 at operation 738 to allow the states of the digital filter 500 to update again while the CDR circuit 400*b* operates in the normal mode. Thereafter, the control hardware 800 reverts back to operation 720 to determine whether or not the received signal strength of the received optical signal 20 is less than the first received signal strength threshold FIG. 8 is a schematic view of an example of the control hardware 800 that may be used to implement the systems and methods described in this document. The control hardware 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 800 includes a processor 810, memory 820, a storage device 830, a high-speed interface/controller 840 connecting to the memory 820 and high-speed expansion ports 850, and a low speed interface/controller 860 connecting to a low speed bus 870 and storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a GUI on an external input/output device, such as a display 880 coupled to a high speed interface 840. In other implementations, multiple processors and/or multiple buses may be used, as appropriate, along with multiple memories and types of memory. Also, multiple control hardware devices 800 may be connected, with each device providing portions of the necessary operations (e.g., as a server bank, a group of blade servers, or a multi-processor system).

The memory 820 includes hardware that stores information non-transitorily within the control hardware 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the control hardware 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 830 is capable of providing mass storage for the control hardware 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The control hardware 800 may be implemented in a number of different forms, as shown in the figure. For example, it may be implemented as a standard server or multiple times in a group of such servers, as a laptop computer, or as part of a rack server system. In other implementations, the control hardware includes a field programmable gate array (FGPA), a digital signal processor (DSP), or any other suitable circuitry.

In some implementations, the control hardware 800 is in communication with memory hardware 802 (e.g., in the memory 820). The control hardware 800 at the first communication terminal 302*a* may determine the receiving power for the optical link 22 based on the optical signal 20 received from the second communication terminal 302*b* through the optical link 22. The receiving power for the optical link 22 may be based on the received signal strength 330 from the optical signal 20 by the receiving optics 308 at the first communication terminal 302. In some examples, the control hardware 800 the receiving power to a first receiving power threshold. For instance, the control hardware 800 may compare the received signal strength 330 to the first received signal strength threshold. In some implementations, the control hardware 800 transitions the CDR circuit 400 from the normal mode to the holdover mode when the receiving power for the optical link 22 is less than the first received power threshold. While in the holdover mode, the CDR circuit 400 is configured to hold the recovered clock 322 to the known-good clock frequency, and thereafter, compares the receiving power for the optical link 22 to the second receiving power threshold which is greater than or equal to the first receiving power threshold. When the receiving power for the optical link is greater than the second receiving power threshold, the control hardware initiates the transition of the CDR circuit 400 from the holdover mode to the normal mode and reacquires synchronization between the recovered clock and a current rate of the incoming data stream using the known-good clock frequency.

A software application (i.e., a software resource 110s) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110hm may be physical devices used to store programs (e.g., sequences of instructions) or data (e.g., program state information) on a temporary or permanent basis for use by a computing device 110hc. The non-transitory memory 110hm may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
  receiving, at a first communication terminal, an optical signal containing an incoming stream of data from a second communication terminal, the first communication terminal having a clock and data recovery circuit operable in a normal mode to synchronize a recovered clock with the incoming data stream for recovering data from the optical signal;
  determining, by control hardware of the first communication terminal, a receiving power for the optical link based on the optical signal, the control hardware implementing the clock and data recovery circuit;
  comparing, by the control hardware, the receiving power to a first receiving power threshold; and
  when the receiving power for the optical link is less than the first receiving power threshold, transitioning, by the control hardware, the clock and data recovery circuit from the normal mode to a holdover mode, the clock and data recovery circuit, when operating in the holdover mode, configured to hold the recovered clock to a known-good clock frequency.

2. The method of claim 1, further comprising:
  comparing, by the control hardware, the receiving power to a second receiving power threshold; and
  when the receiving power for the optical link is greater than the second receiving power threshold:

initiating, by the control hardware, a transition of the clock and data recovery circuit from the holdover mode to the normal mode; and reacquiring, by the control hardware, synchronization between the recovered clock and a current rate of the incoming data stream using the known-good clock frequency.

3. The method of claim 1, further comprising:

detecting, by the control hardware, a received signal strength from the optical signal, wherein determining the receiving power for the optical link is based on the received signal strength of the optical signal, wherein the first receiving power threshold is based on a first received signal strength threshold, and wherein the second receiving power threshold is based on a second received signal strength threshold.

4. The method of claim 1, further comprising determining, by the control hardware, an onset of an optical fade over the optical link when the receiving power for the optical link is less than the first receiving power threshold.

5. The method of claim 1, wherein the first receiving power threshold is less than or equal to the second receiving power threshold.

6. The method of claim 1, wherein the clock and data recover circuit comprises:

a frequency locked loop configured to recover the clock from the incoming data stream during the normal mode or hold the recovered clock to the known-good clock frequency during the holdover mode; and a data recovery loop configured to align the recovered clock with a phase of the incoming data stream to recover the data.

7. The method of claim 6, further comprising:

determining, by the control hardware, phase/frequency errors of the frequency locked loop based upon a difference between a data rate of the incoming data stream and a frequency of the recovered clock;

digitizing, by the control hardware, the phase/frequency errors to produce digital clock samples of the frequency locked loop;

inputting, by the control hardware, the digital clock samples to a digital filter of the frequency locked loop;

for each digital clock sample input to the digital filter, applying, by the control hardware, predefined acceptance-rejection criteria to determine whether each digital clock sample is accepted or rejected; and filtering, by the control hardware, each accepted digital clock sample to output a running average of the data rate of the incoming data stream from the digital filter.

8. The method of claim 7, further comprising:

when the clock and data recovery circuit operates in the normal mode:

converting, by the control hardware, the digital clock samples to analog clock samples; and driving, by the control hardware, a voltage control oscillator of the clock and data recovery circuit with the analog clock samples to output the recovered clock.

9. The method of claim 7, further comprising:

when the clock and data recovery circuit operates in the holdover mode:

converting, by the control hardware, the running average of the data rate of the incoming data stream output from the digital filter into an analog signal; and driving, by the control hardware, a voltage oscillator of the clock and data recovery circuit with the analogue signal to output a holdover clock, the holdover clock input to the data recovery loop.

10. The method of claim 7, wherein applying the predefined acceptance-rejection criteria comprises:

arranging, by the control hardware, the digital clock samples input to the digital filter into one or more corresponding frames of a frame structure;

determining, by the control hardware, whether a frame alignment sequence is identified in a beginning of each frame; and when the frame alignment sequence is not identified in the beginning of a current frame, rejecting, by the control hardware, each digital clock sample in the current frame.

11. The method of claim 10, further comprising, when the frame alignment sequence is not identified in the beginning of the current frame, rejecting, by the control hardware, each digital clock sample in a previous frame.

12. The method of claim 10, further comprising:

when the frame alignment sequence is identified in the beginning of the current frame:

accepting, by the control hardware, each digital clock sample in the current frame when the frame alignment sequence is identified in the beginning of a subsequent frame; or rejecting, by the control hardware, each digital clock sample in the current frame when the frame alignment sequence is not identified in the beginning of the subsequent frame.

13. The method of claim 6, further comprising:

determining, by the control hardware, phase errors of the frequency locked loop based upon a difference between a phase of the incoming data stream and a phase of the recovered clock output from a phase interpolator of the frequency locked loop;

digitizing, by the control hardware, the phase errors to produce digital control states;

inputting, by the control hardware, the digital control states to a digital filter of the frequency locked loop;

for each digital control state input to the digital filter, applying, by the control hardware, predefined acceptance-rejection criteria to determine whether each digital clock sample is accepted or rejected; and filtering, by the control hardware, each accepted digital clock sample to output a running average of the data rate of the incoming data stream from the digital filter.

14. The method of claim 13, wherein the phase interpolator outputs the recovered clock by combining multi-phase clocks obtained from a fundamental clock.

15. The method of claim 13, further comprising:

when the clock and data recovery circuit operates in the normal mode, inputting, by the control hardware, the digital control states to the phase interpolator to output the recovered clock; and when the clock and data recovery circuit operates in the holdover mode, inputting, by the control hardware, the running average of the data rate of the incoming data stream to the phase interpolator to output a holdover clock.

16. A first communication terminal comprising:

receiving optics configured to receive an optical signal from a second communication terminal, the received optical signal containing an incoming stream of data;

control hardware in communication with receiving optics and implementing a clock and data recovery circuit operable in a normal mode to synchronize a recovered clock with the incoming data stream for recovering data from the optical signal; and memory hardware in communication with the control hardware, the memory hardware storing instructions that when executed on the control hardware cause the control hardware to perform operations comprising:
  determining a receiving power for the optical link based on the optical signal;
  comparing the receiving power to a first receiving power threshold; and
  when the receiving power for the optical link is less than the first receiving power threshold, transitioning the clock and data recovery circuit from the normal mode to a holdover mode, the clock and data recovery circuit, when operating in the holdover mode, configured to hold the recovered clock to a known-good clock frequency.

17. The first communication terminal of claim 16, wherein the operations further comprise:
  comparing the receiving power to a second receiving power threshold; and
  when the receiving power for the optical link is greater than the second receiving power threshold:
    initiating a transition of the clock and data recovery circuit from the holdover mode to the normal mode; and
    reacquiring synchronization between the recovered clock and a current rate of the incoming data stream using the known-good clock frequency.

18. The first communication terminal of claim 16, wherein the operations further comprise:
  detecting a received signal strength from the optical signal, wherein determining the receiving power for the optical link is based on the received signal strength of the optical signal,
  wherein the first receiving power threshold is based on a first received signal strength threshold, and
  wherein the second receiving power threshold is based on a second received signal strength threshold.

19. The first communication terminal of claim 16, wherein the operations further comprise determining an onset of an optical fade over the optical link when the receiving power for the optical link is less than the first receiving power threshold.

20. The first communication terminal of claim 16, wherein the first receiving power threshold is less than or equal to the second receiving power threshold.

21. The first communication terminal of claim 16, wherein the clock and data recover circuit comprises:
  a frequency locked loop configured to recover the clock from the incoming data stream during the normal mode or hold the recovered clock to the known-good clock frequency during the holdover mode; and
  a data recovery loop configured to align the recovered clock with a phase of the incoming data stream to recover the data.

22. The first communication terminal of claim 21, wherein the operations further comprise:
  determining phase/frequency errors of the frequency locked loop based upon a difference between a data rate of the incoming data stream and a frequency of the recovered clock;
  digitizing the phase/frequency errors to produce digital clock samples of the frequency locked loop;
  inputting the digital clock samples to a digital filter of the frequency locked loop;
  for each digital clock sample input to the digital filter, applying predefined acceptance-rejection criteria to determine whether each digital clock sample is accepted or rejected; and
  filtering each accepted digital clock sample to output a running average of the data rate of the incoming data stream from the digital filter.

23. The first communication terminal of claim 22, wherein the operations further comprise:
  when the clock and data recovery circuit operates in the normal mode:
    converting the digital clock samples to analog clock samples; and
    driving a voltage control oscillator of the clock and data recovery circuit with the analog clock samples to output the recovered clock.

24. The first communication terminal of claim 22, wherein the operations further comprise:
  when the clock and data recovery circuit operates in the holdover mode:
    converting the running average of the data rate of the incoming data stream output from the digital filter into an analog signal; and
    driving a voltage oscillator of the clock and data recovery circuit with the analogue signal to output a holdover clock, the holdover clock input to the data recovery loop.

25. The first communication terminal of claim 22, wherein applying the predefined acceptance-rejection criteria comprises:
  arranging the digital clock samples input to the digital filter into one or more corresponding frames of a frame structure;
  determining whether a frame alignment sequence is identified in a beginning of each frame; and
  when the frame alignment sequence is not identified in the beginning of a current frame, rejecting each digital clock sample in the current frame.

26. The first communication terminal of claim 25, wherein the operations further comprise, when the frame alignment sequence is not identified in the beginning of the current frame, rejecting each digital clock sample in a previous frame.

27. The first communication terminal of claim 25, wherein the operations further comprise:
  when the frame alignment sequence is identified in the beginning of the current frame:
    accepting each digital clock sample in the current frame when the frame alignment sequence is identified in the beginning of a subsequent frame; or
    rejecting each digital clock sample in the current frame when the frame alignment sequence is not identified in the beginning of the subsequent frame.

28. The first communication terminal of claim 21, wherein the operations further comprise:
  determining phase errors of the frequency locked loop based upon a difference between a phase of the incoming data stream and a phase of the recovered clock output from a phase interpolator of the frequency locked loop;
  digitizing the phase errors to produce digital control states;
  inputting the digital control states to a digital filter of the frequency locked loop;

for each digital control state input to the digital filter, applying predefined acceptance-rejection criteria to determine whether each digital clock sample is accepted or rejected; and filtering each accepted digital clock sample to output a running average of the data rate of the incoming data stream from the digital filter.

29. The first communication terminal of claim 28, wherein the phase interpolator outputs the recovered clock by combining multi-phase clocks obtained from a fundamental clock.

30. The first communication terminal of claim 28, wherein the operations further comprise:

when the clock and data recovery circuit operates in the normal mode, inputting the digital control states to the phase interpolator to output the recovered clock; and when the clock and data recovery circuit operates in the holdover mode, inputting the running average of the data rate of the incoming data stream to the phase interpolator to output a holdover clock.

* * * * *